(12) United States Patent
Huang et al.

(10) Patent No.: US 10,780,867 B2
(45) Date of Patent: Sep. 22, 2020

(54) AUTOMATIC BRAKE ASSIST DEVICE FOR AN ELECTRIC TWO-WHEELED VEHICLE

(71) Applicant: KUNSHAN JUNLEI ELECTRONIC CO., LTD., Kunshan (CN)

(72) Inventors: Ji Huang, Kunshan (CN); Zhen Kai Wen, Kunshan (CN)

(73) Assignee: KUNSHAN JUNLEI ELECTRONIC CO., LTD., Kunshan (CN)

( * ) Notice: Subject to any disclaimer, the term of this patent is extended or adjusted under 35 U.S.C. 154(b) by 0 days.

(21) Appl. No.: 16/361,831

(22) Filed: Mar. 22, 2019

(65) Prior Publication Data

US 2020/0070787 A1 Mar. 5, 2020

(30) Foreign Application Priority Data

Sep. 3, 2018 (TW) .............................. 107212037 U

(51) Int. Cl.
*B60T 7/04* (2006.01)
*B60T 1/06* (2006.01)
(Continued)

(52) U.S. Cl.
CPC .............. *B60T 7/042* (2013.01); *B60T 1/062* (2013.01); *B60T 7/12* (2013.01); *B60T 13/586* (2013.01); *B60T 13/662* (2013.01); *B60T 8/4809* (2013.01)

(58) Field of Classification Search
CPC ...... B60T 7/042; B60T 13/662; B60T 8/4809; B60T 1/062; B60T 13/586; B60T 7/12; B60L 3/0015; B60L 7/18; B60L 7/26
See application file for complete search history.

(56) References Cited

U.S. PATENT DOCUMENTS 5,314,037 A * 5/1994 Shaw ................... B60R 16/0231
180/169
9,969,270 B2 * 5/2018 Luke ..................... B60W 20/14
(Continued)

FOREIGN PATENT DOCUMENTS

| CN | 202923761 U | 5/2013 |
| CN | 206307187 U | 7/2017 |
| WO | WO-2018058273 A1 * | 4/2018 |

OTHER PUBLICATIONS

Translation of WO document No. 2018/058273 obtained from website https://worldwide.espacenet.com on May 12, 2020.*

*Primary Examiner* — Pamela Rodriguez
(74) *Attorney, Agent, or Firm* — Muncy, Geissler, Olds & Lowe, P.C.

(57) ABSTRACT

An automatic brake assist device for an electric two-wheeled vehicle, the electric two-wheeled vehicle includes a main control module, having: a radar sensor module, used to measure a distance from a pair of objects; a control module, connected to the radar sensor module and the main control module, when the distance is changed from greater than a first braking distance to less than the first braking distance, transmitting a first brake braking mode signal to the main control module to decelerate the electric two-wheeled vehicle; when the distance is changed from greater than a second braking distance to less than the second braking distance, transmitting a second brake braking mode signal to the main control module to decelerate the electric two-wheeled vehicle; when the distance is changed from greater than a third braking distance to less than the third braking distance, transmitting a third brake braking mode signal to the main control module to decelerate the electric two-wheeled vehicle.

12 Claims, 4 Drawing Sheets

(51) Int. Cl.
*B60T 7/12* (2006.01)
*B60T 13/58* (2006.01)
*B60T 13/66* (2006.01)
*B60T 8/48* (2006.01)

(56) References Cited

U.S. PATENT DOCUMENTS

2013/0090822 A1* 4/2013 Schwindt ............... B60T 1/10
                                                  701/70
2015/0298693 A1* 10/2015 Uechi ................. B60T 7/22
                                                  701/70

\* cited by examiner

AUTOMATIC BRAKE ASSIST DEVICE FOR AN ELECTRIC TWO-WHEELED VEHICLE

FIELD OF THE INVENTION

The present invention relates to an electric two-wheeled vehicle, especially for an automatic brake assist device for an electric two-wheeled vehicle.

BACKGROUND

Electric two-wheeled vehicles have the advantages of energy saving, carbon reduction, high mobility, and convenient parking. Therefore, they are very suitable as short-distance travel tools for metropolitan areas.

However, the study found that the most common cause of car accidents in urban busy traffic in the metropolitan areas is the driver's inattention to the road. In particular, after the popularity of smart mobile devices, the cause of car accidents caused by drivers riding electric two-wheeled vehicles but not paying attention to road conditions has increased significantly.

Electric two-wheeled vehicles are generally considered to be less dangerous because they are smaller, lighter and have slower speeds, thus their anti-collision technology has not been developed and popularized. However, there are still many related studies to be launched.

For example, CN202923761 discloses an electric bicycle rear-end collision avoidance alarm system, which uses an ultrasonic transceiver circuit to measure the distance and transmits an alarm through a speaker. For example, CN10357655 discloses a safe driving device and method for an electric bicycle, which uses a speed measuring module, a speed control module and an audible and visual alarm module, etc., and performs speed limit and alarm when the driver has bad driving behavior. For example, CN206307187 discloses a collision warning device of an electric bicycle that uses an ultrasonic probe to detect the distance and warns when the distance exceeds the safe distance.

As can be seen from the above techniques, since the speed of the electric bicycle (electric two-wheeled vehicle) is low, the current technology only provides an alarm to remind first the driver to take care of possible problems, or the specific behavior of the driver, for example, no holding the handle and other conditions, and then perform the specific speed limit. It can not prevent the driver from the harm caused by unfocused conditions.

Therefore, how to enable the electric two-wheeled vehicle to automatically detect factors that may cause a collision while driving, and prevent possible collisions in advance, thereby reducing the possibility of collision, has become a focus of the technology development for the electric two-wheeled vehicle manufacturers.

SUMMARY OF THE INVENTION

In view of the above problems of the prior art, the present invention provides an automatic brake assist device for an electric two-wheeled vehicle, which can achieve the technical effect of multi-stage automatic braking assistance for the electric two-wheeled vehicle.

The present invention discloses an automatic brake assist device for an electric two-wheeled vehicle, applied to an electric two-wheeled vehicle, comprising: a radar sensor module, used to measure a distance from an opposite object; a main control module, connected to the radar sensor module, when the distance is changed from greater than a first braking distance to less than the first braking distance, performing a first brake braking mode to decelerate the electric two-wheeled vehicle; when the distance is changed from greater than a second braking distance to less than the second braking distance, performing a second brake braking mode to decelerate the electric two-wheeled vehicle; when the distance is changed from greater than a third braking distance to less than the third braking distance, performing a third braking mode to decelerate the electric two-wheeled vehicle.

The present invention discloses an automatic brake assist device for an electric two-wheeled vehicle, the electric two-wheeled vehicle comprising a main control module, comprising: a radar sensor module, used to measure a distance from a pair of objects; a control module, connected to the radar sensor module and the main control module, when the distance is changed from greater than a first braking distance to less than the first braking distance, transmitting a first brake braking mode signal to the main control module to decelerate the electric two-wheeled vehicle; when the distance is changed from greater than a second braking distance to less than the second braking distance, transmitting a second brake braking mode signal to the main control module to decelerate the electric two-wheeled vehicle; when the distance is changed from greater than a third braking distance to less than the third braking distance, transmitting a third brake braking mode signal to the main control module to decelerate the electric two-wheeled vehicle.

To make the foregoing and other objects, features, and advantages of the present invention more comprehensible and obvious, several preferred embodiments are described below in detail with reference to the accompanying drawings.

SCHEMATIC BRIEF DESCRIPTION

DETAILED EMBODIMENT

The present invention uses a radar sensor to detect the relative distance between the electric two-wheeled vehicle and the opposite object, and then performs different automatic braking assist control according to different preset distances. It thereby realizes the active collision avoidance control of the electric two-wheeled vehicle, enhances the safety of electric two-wheelers and prevents possible dangers caused by inattention of drivers of electric two-wheelers.

Figure 1A:
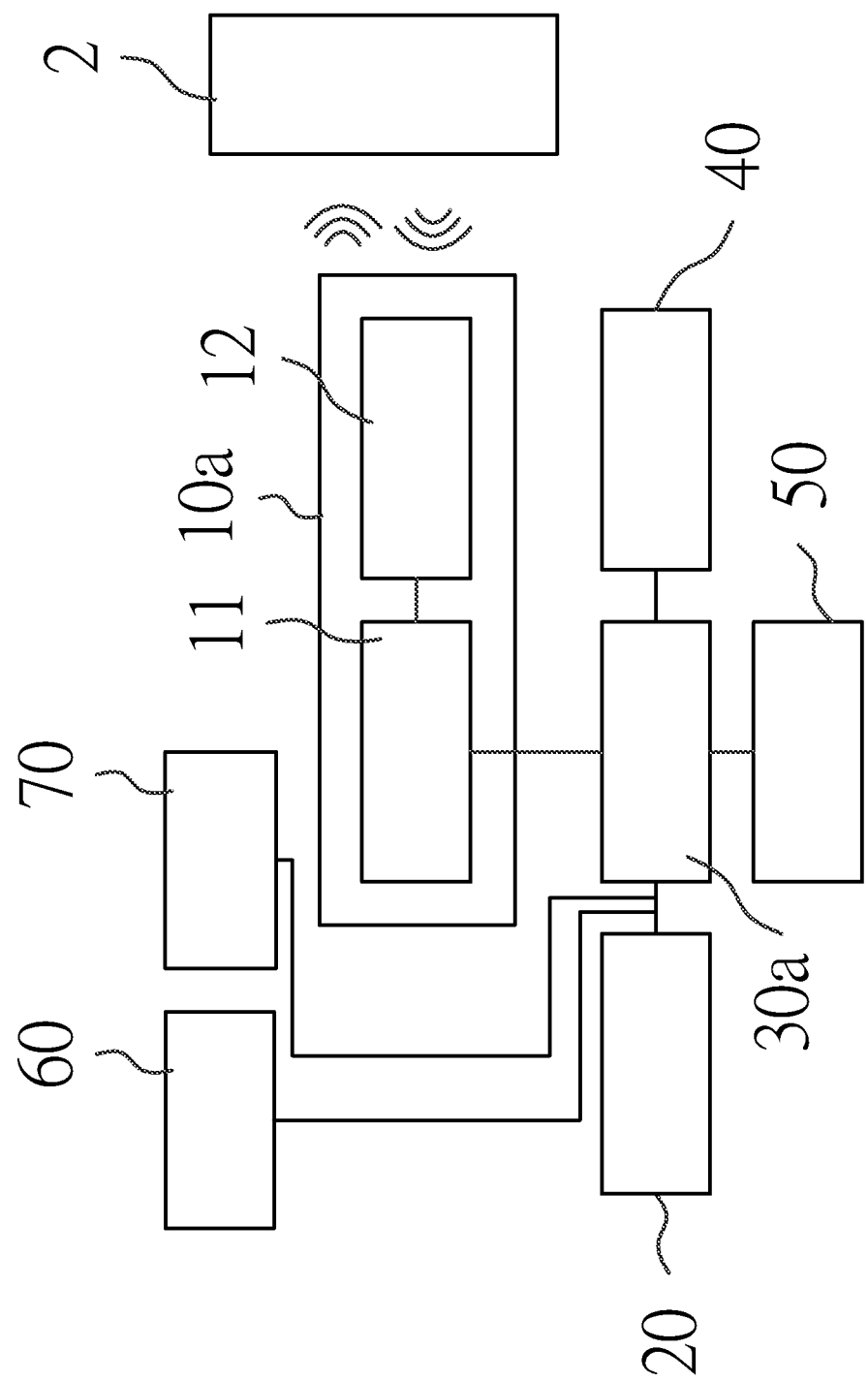
FIG. 1A is an embodiment of a functional block diagram of an automatic brake assist device for an electric two-wheeled vehicle of the present invention.

First, referring to FIG. 1A, it discloses an embodiment of a functional block diagram of the automatic brake assist device for the electric two-wheeled vehicle of the present invention. The automatic brake assist device 10a for the electric two-wheeled vehicle is implemented by using an external module. The automatic brake assist device 10*a* for the electric two-wheeled vehicle is applied to an electric two-wheeled vehicle, and the electric two-wheeled vehicle includes a braking system 20, a main control module 30*a*, a speed measuring module 40, an electric motor 50, a display screen 60 and a speaker 70, and the like. The automatic brake assist device 10*a* for the electric two-wheeled vehicle comprises a radar sensor module 12 and a control module 11. Wherein, the radar sensor module 12 measures the distance from the opposite object 2; the control module 11 is connected to the radar sensor module 12 and the main control module 30*a*. The main control module 30*a* is connected to the brake system 20, the speed measuring module 40, the electric motor 50, the display screen 60, the speaker 70, and the like. The main control module 30*a* is used to control the actuation of the brake system 20, the speed measuring module 40, the electric motor 50, the display screen 60, the speaker 70, and the like. The control module 11 receives the distance measured by the radar sensor module 12 from the opposite object 2, and transmits a first brake braking mode signal to the main control module 30*a* to decelerate the electric two-wheeled vehicle when the distance is changed from a first braking distance to the distance less than the first braking distance; transmits a second brake braking mode signal to the main control module 30*a* to decelerate the electric two-wheeled vehicle when the distance is changed from a second braking distance to the distance less than the second braking distance; transmits a third brake braking mode signal to the main control module 30*a* to decelerate the electric two-wheeled vehicle when the distance is changed from a third braking distance to the distance less than the third braking distance.

Wherein, the first braking distance is from 10 meters to 5 meters, the second braking distance is from 5 meters to 3 meters, and the third braking distance is from 3 meters to 1 meter. The invention concept of the present invention distinguishes three brake braking intervals, a first braking distance to a second braking distance, a second braking distance to a third braking distance, and within a third braking distance. For these three different braking intervals, the brake braking are controlled when the distance is changed from large to small, and vice versa.

Figure 2:
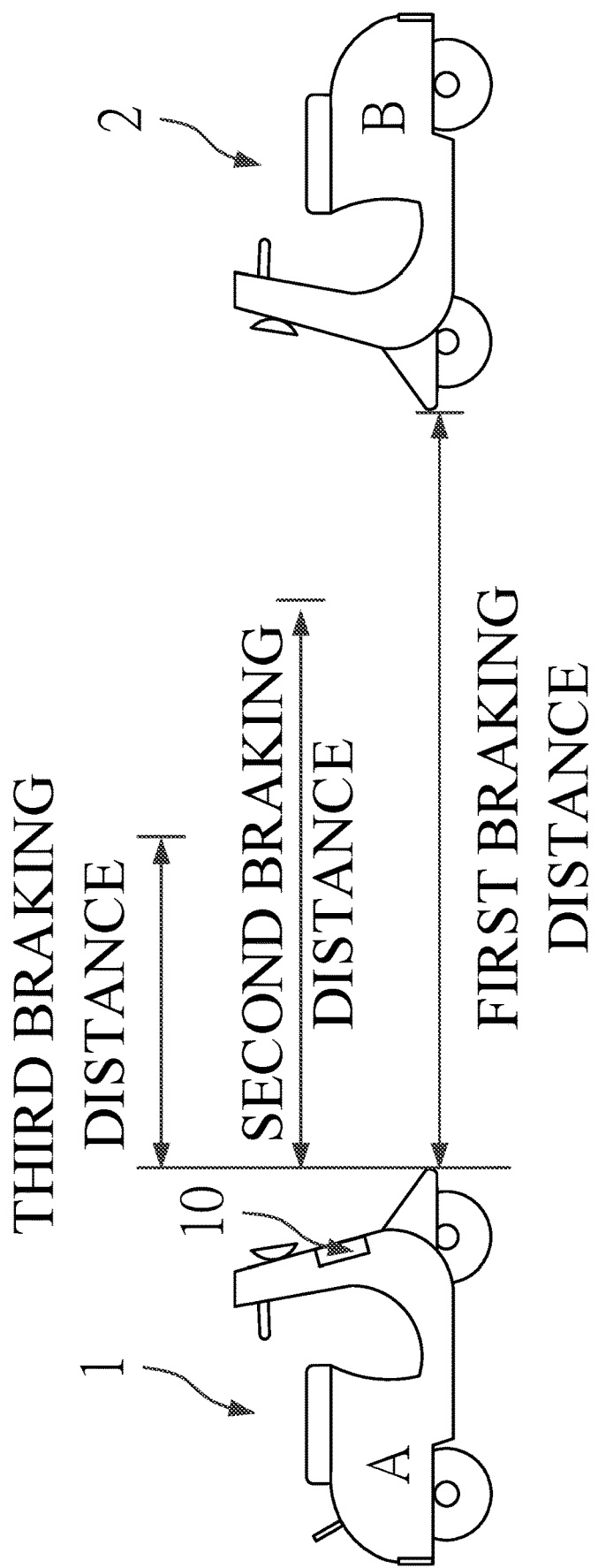
FIG. 2 is a schematic diagram of braking distance control of the automatic brake assisting device for the electric two-wheeled vehicle of the present invention.

Referring to FIG. 2, when the measured distance between the electric two-wheeled vehicle 1 and the opposite object 2 is getting farther and farther, there is no safety concern at this time, and naturally no automatic brake braking control is required. Similarly, when the measured distance between the two-wheeled vehicle 1 and the opposite object 2 is greater than the first braking distance, there is also no safety concern, and automatic brake braking control is not required. When the measured distance between the electric two-wheeled vehicle 1 and the opposite object 2 is changed from greater than the first braking distance to less than the first braking distance, it indicates that the distance between the electric two-wheeled vehicle 1 and the opposite object 2 has begun to approach, so the present invention adopts the first brake braking mode for a slight automatic brake. Due to the slight braking of the automatic braking, the driver's body will feel the resistance provided by the electric two-wheeled vehicle 1, and therefore, a preliminary reminder and warning function will be generated. In addition, the combination with warning of the display screen 60 and the speaker 70 would be relatively easy to notice. When the measured distance between the electric two-wheeled vehicle 1 and the opposite object 2 is changed from greater than the second braking distance to smaller than the second braking distance, it indicates that the distance between the electric two-wheeled vehicle 1 and the opposite object 2 is closer, so the present invention adopts the second brake mode to perform a slightly increased automatic brake. Due to the increased braking of the automatic braking, the driver's body will feel the greater resistance generated by the electric two-wheeled vehicle 1, and therefore, a deeper reminder and warning effect will be generated. In addition, the combination with warning of the display screen 60 and the speaker 70 would be more easily noticed. When the measured distance between the electric two-wheeled vehicle 1 and the opposite object 2 is changed from greater than the third braking distance to less than the third braking distance, it indicates that the distance between the electric two-wheeled vehicle 1 and the opposite object 2 is close to a dangerous distance, so the present invention adopts a third brake braking mode to perform a heavier automatic brake. Due to the heavier braking of the automatic braking, the driver's body will greatly feel the large resistance generated by the electric two-wheeled vehicle 1, and therefore, a strong reminder and warning effect will be generated.

In the following, there are several ways to generate an automatic brake:

1. The main control module 30*a* controls the braking system 20 to perform a braking force output of 5-15% in the first brake braking mode, a braking force output of 15-50% in the second brake braking mode, a braking force output of 50-90% in the third braking mode. In another embodiment, the braking force output of 50-100% may be set in the third braking mode.

2. The main control module 30*a* controls the braking system 20 to perform in another way: The main control module 30*a* controls the braking system 20, in the first brake braking mode, to perform a braking force output of 10-15% when the speed is 25 km/h or more detected by the speed measuring module 40, a braking force output of 5-10% when the speed is 25-15 km/h detected by the speed measuring module 40, a braking force output of 1-5% when the speed is 15-10 km/h detected by the speed measuring module 40; in the second brake braking mode, to perform a braking force output of 35-50% when the speed is 25 km/h or more detected by the speed measuring module 40, a braking force output of 25-35% when the speed is 25-15 km/h detected by the speed measuring module 40, a braking force output of 15-25% when the speed is 15-10 km/h detected by the speed measuring module 40; in the third braking mode, to perform a braking force output of 75-90% when the speed is 25 km/h or more detected by the speed measuring module 40, a braking force output of 60-75% when the speed is 25-15 km/h detected by the speed measuring module 40, a braking force output of 50-60% when the speed is 15-10 km/h detected by the speed measuring module 40.

3. The main control module 30*a* controls the electric motor 50 to perform a braking power output of 5-15% in the first brake braking mode, a braking power output of 15-50% in the second brake braking mode, a braking power output of 50-90% in the third braking mode. In another embodiment, the braking power output of 50-100% may be set in the third braking mode.

4. The main control module 30*a* controls the electric motor 50 in another way: The main control module 30*a* controls the electric motor 50, in the first brake braking mode, to perform a braking power output of 20-30% when the speed is 25 km/h or more detected by the speed measuring module 40, a braking power output of 10-20% when the speed is 25-15 km/h detected by the speed measuring module, a braking power output of 5-10% when the speed is 15-10 km/h detected by the speed measuring module; in the second brake braking mode, to perform a braking power output of 30-40% when the speed is 25 km/h or more detected by the speed measuring module, a braking power output of 20-30% when the speed is 25-15 km/h detected by the speed measuring module, a braking power output of 10-20% when the speed is 15-10 km/h detected by the speed measuring module; in the third braking mode, to perform a braking power output of 50-70% when the speed is 25 km/h or more detected by the speed measuring module, a braking power output of 30-50% when the speed is 25-15 km/h detected by the speed measuring module, a braking power output of 20-30% when the speed is 15-10 km/h detected by the speed measuring module.

The above various automatic brake braking modes are simply controlling the braking system 20 and simply controlling the motor 50. Another mode is to simultaneously control the braking system 20 and the electric motor 50 by a combination of the above two methods.

Figure 1B:
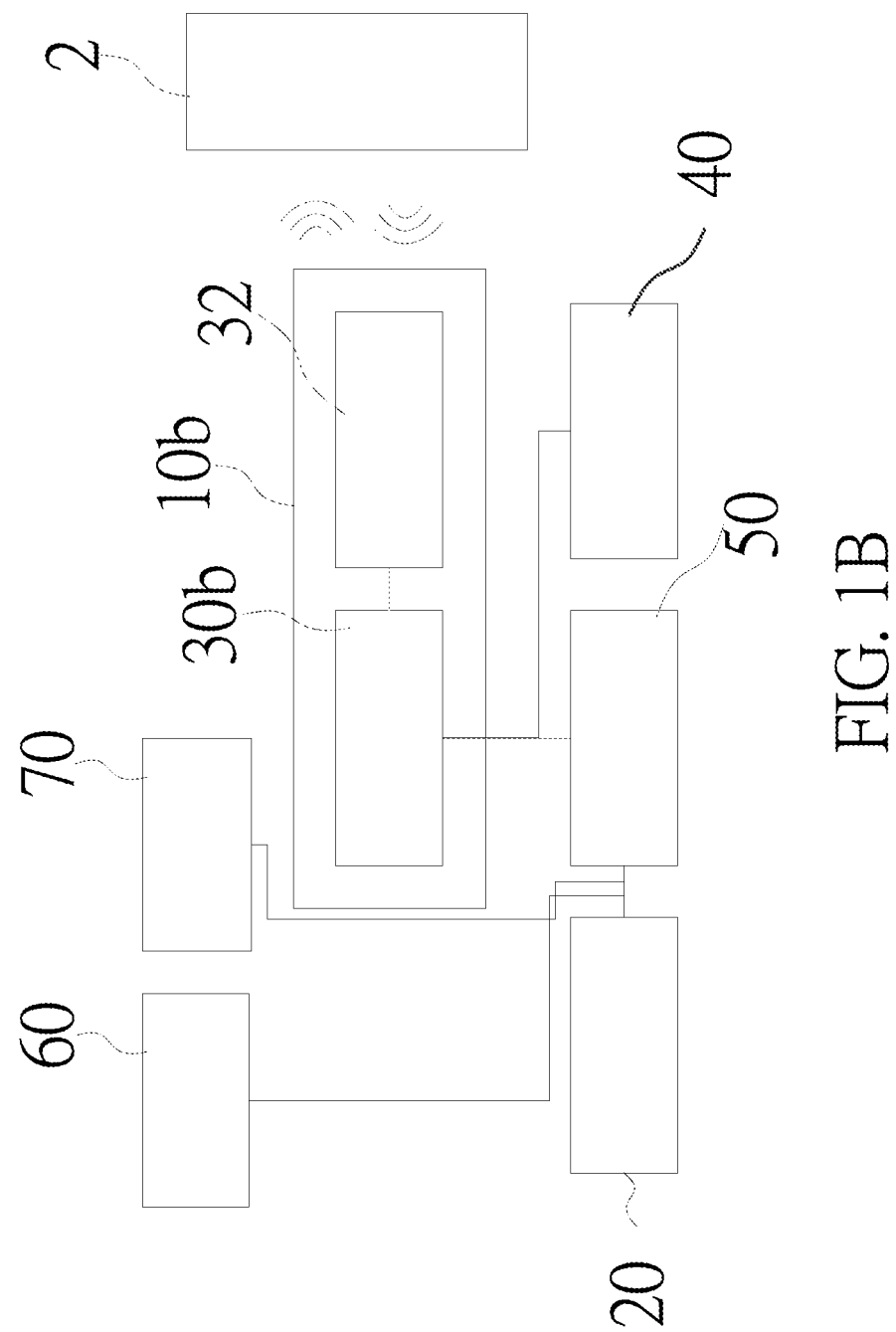
FIG. 1B is still another embodiment of a functional block diagram of the automatic brake assist device for the electric two-wheeled vehicle of the present invention.

Next, referring to FIG. 1B, another embodiment of the functional block diagram of the automatic brake assist device for the electric two-wheeled vehicle of the present invention, the automatic brake assist device 10b of the present embodiment adopts the main control module 30b directly of the electric two-wheeled vehicle to implement the controlled manner. Similarly, please also refer to FIG. 2 together. In this embodiment, the automatic brake assist device 10b for the electric two-wheeled vehicle comprises a radar sensor module 32 and a main control module 30b. Similarly, the other part of the electric two-wheeled vehicle 1 comprises the braking system 20, the speed measuring module 40, the electric motor 50, the display screen 60 and the speaker 70, and the like. The radar sensor module 32 measures the distance from the opposite object 2; the main control module 30b connects the radar sensor module 32 and the braking system 20, the speed measuring module 40, the motor 50, the display screen 60 and the speaker 70, and the like. When the distance measured by the radar sensor module 32 is changed from a first braking distance to the distance less than the first braking distance, the main control module 30b performs a first brake braking mode to decelerate the electric two-wheeled vehicle 1; When the distance measured by the radar sensor module 32 is changed from a second braking distance to the distance less than the second braking distance, the main control module 30b performs a second brake braking mode to decelerate the electric two-wheeled vehicle 1; When the distance measured by the radar sensor module is changed from a third braking distance to the distance less than the third braking distance, the main control module 30b performs a third brake braking mode to decelerate the electric two-wheeled vehicle 1.

Similarly, as in the embodiment of FIG. 1, the first braking distance is from 10 meters to 5 meters, the second braking distance is from 5 meters to 3 meters, and the third braking distance is from 3 meters to 1 meter. The mechanism of automatic brake braking is the same, and will not be described again here.

As in the embodiment of FIG. 1, there are several ways to generate an automatic brake:

1. The main control module 30b controls the braking system 20 to perform a braking force output of 5-15% in the first brake braking mode, a braking force output of 15-50% in the second brake braking mode, a braking force output of 50-90% in the third braking mode. In another embodiment, the braking power output of 50-100% may be set in the third braking mode.

2. The main control module 30b controls the braking system 20 to perform in another way: The main control module 30a controls the braking system 20, in the first brake braking mode, to perform a braking force output of 10-15% when the speed is 25 km/h or more detected by the speed measuring module 40, a braking force output of 5-10% when the speed is 25-15 km/h detected by the speed measuring module 40, a braking force output of 1-5% when the speed is 15-10 km/h detected by the speed measuring module 40; in the second brake braking mode, to perform a braking force output of 35-50% when the speed is 25 km/h or more detected by the speed measuring module 40, a braking force output of 25-35% when the speed is 25-15 km/h detected by the speed measuring module 40, a braking force output of 15-25% when the speed is 15-10 km/h detected by the speed measuring module 40; in the third braking mode, to perform a braking force output of 75-90% when the speed is 25 km/h or more detected by the speed measuring module 40, a braking force output of 60-75% when the speed is 25-15 km/h detected by the speed measuring module 40, a braking force output of 50-60% when the speed is 15-10 km/h detected by the speed measuring module 40.

3. The main control module 30b controls the electric motor 50 to perform a braking power output of 5-15% in the first brake braking mode, a braking power output of 15-50% in the second brake braking mode, a braking power output of 50-90% in the third braking mode. In another embodiment, the braking power output of 50-100% may be set in the third braking mode.

4. The main control module 30b controls the electric motor 50 in another way: The main control module 30b controls the electric motor 50, in the first brake braking mode, to perform a braking power output of 20-30% when the speed is 25 km/h or more detected by the speed measuring module 40, a braking power output of 10-20% when the speed is 25-15 km/h detected by the speed measuring module, a braking power output of 5-10% when the speed is 15-10 km/h detected by the speed measuring module; in the second brake braking mode, to perform a braking power output of 30-40% when the speed is 25 km/h or more detected by the speed measuring module, a braking power output of 20-30% when the speed is 25-15 km/h detected by the speed measuring module, a braking power output of 10-20% when the speed is 15-10 km/h detected by the speed measuring module; in the third braking mode, to perform a braking power output of 50-70% when the speed is 25 km/h or more detected by the speed measuring module, a braking power output of 30-50% when the speed is 25-15 km/h detected by the speed measuring module, a braking power output of 20-30% when the speed is 15-10 km/h detected by the speed measuring module.

The above various automatic brake braking modes are simply controlling the braking system 20 and simply controlling the motor 50. Another mode is to simultaneously control the braking system 20 and the electric motor 50 by a combination of the above two methods.

The embodiment of FIG. 1A adopts an external control module to realize the control of the electric brake assisting device for the electric two-wheeled vehicle. The embodiment of FIG. 1B adopts the main control module of the electric two-wheeled vehicle to realize the control of the electric brake assisting device for the electric two-wheeled vehicle. The method used by the two is consistent, but the system is slightly different.

Figure 3:
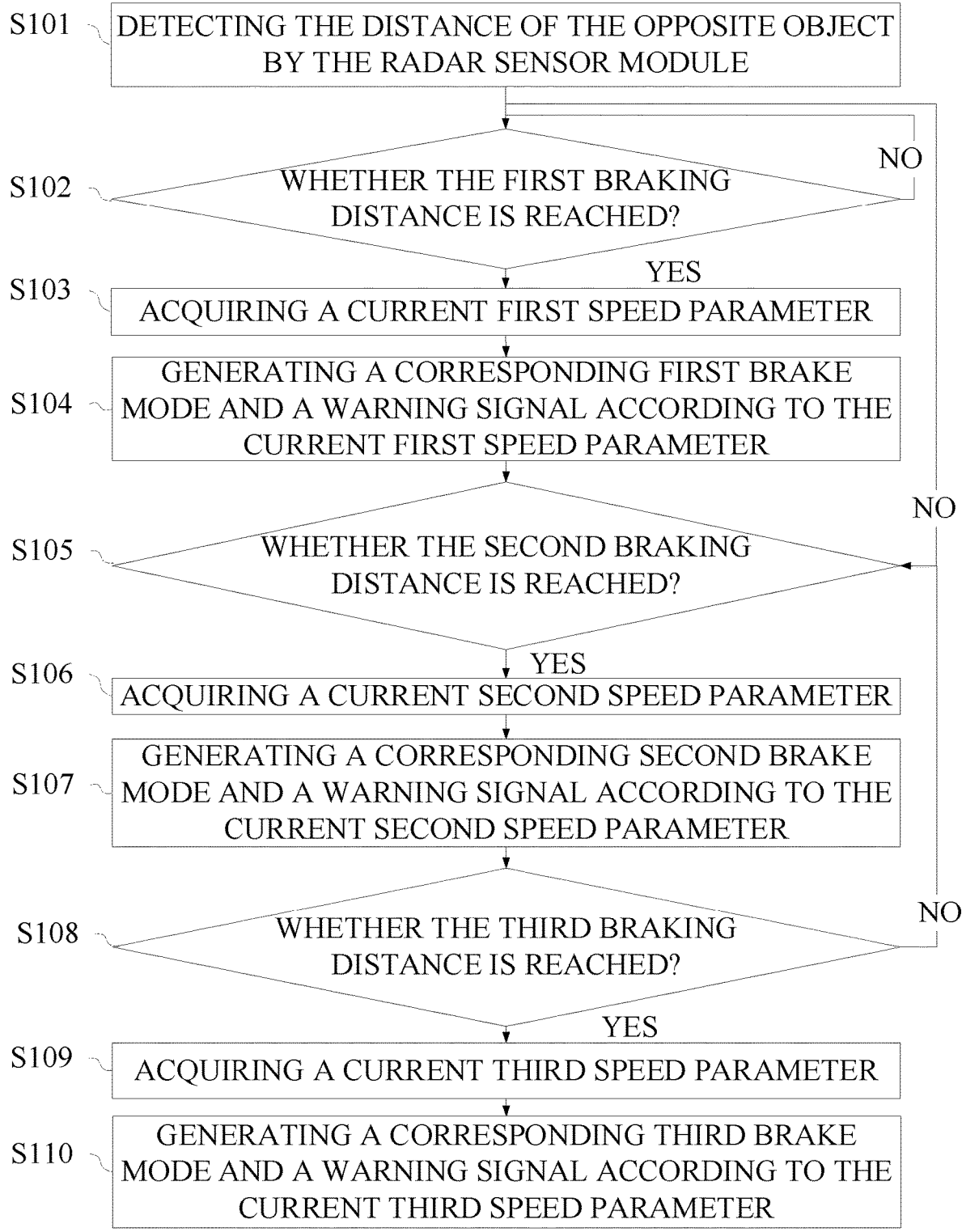
FIG. 3 is a flow chart showing the control of the automatic brake assisting device for the electric two-wheeled vehicle of the present invention.

Next, please refer to FIG. 3 and also refer to FIG. 1A, FIG. 1B and FIG. 2 at the same time, FIG. 3 is a flow chart showing the control of the automatic brake assisting device for the electric two-wheeled vehicle of the present invention, which comprises the following steps:

Step S101: Detecting the distance of the opposite object by the radar sensor module. The radar sensor module 12 or the radar sensor module 32 can transmit the radar signal and analyze the received radar signal, and then calculate the distance between the radar sensor module 12/the radar sensor module 32 and the opposite object 2.

Step S102: Whether the first braking distance is reached? If yes, the process proceeds to step S103, and if not, the process proceeds to step S10 continuously. As previously mentioned, the first braking distance can be set from 10 meters to 5 meters.

Step S103: Acquiring a current first speed parameter. The methods to acquire the speed parameter includes using the speed measuring module 40 to calculate the speed of the electric two-wheeled vehicle 1, and also using the radar sensor module to detect the distance and relative speed of the opposite object 2 in the front. In this way, the radar sensor module can be substituted for the speed measuring module 40.

Step S104: Generating a corresponding first brake braking mode and a warning signal according to the current first speed parameter. As previously mentioned, the first brake braking mode can be used to control the braking system 20 or to control the electric motor 50; the warning signal can be used to control the display screen 60 or the speaker 70.

Step S105: Whether the second braking distance is reached? If yes, the process proceeds to step S106, and if not, the steps S102 to S104 are continued. As previously mentioned, the second braking distance can be set from 5 meters to 3 meters.

Step S106: Acquiring a current second speed parameter. The methods to acquire the speed parameter includes using the speed measuring module 40 to calculate the speed of the electric two-wheeled vehicle 1, and also using the radar sensor module to detect the distance and relative speed of the opposite object 2 in the front. In this way, the radar sensor module can be substituted for the speed measuring module 40.

Step S107: Generating a corresponding second brake braking mode and a warning signal according to the current second speed parameter. As previously mentioned, the second brake braking mode can be used to control the braking system 20 or to control the electric motor 50; the warning signal can be used to control the display screen 60 or the speaker 70.

Step S108: Whether the third braking distance is reached? As described above, the third braking distance can be set from 3 meters to 1 meter.

Step S109: Acquiring a current third speed parameter. The methods to acquire the speed parameter includes using the speed measuring module 40 to calculate the speed of the electric two-wheeled vehicle 1, and also using the radar sensor module to detect the distance and relative speed of the opposite object 2 in the front. In this way, the radar sensor module can be substituted for the speed measuring module 40.

Step S110: Generating a corresponding third brake braking mode and a warning signal according to the current third speed parameter. As previously mentioned, the third brake braking mode can be used to control the braking system 20 or to control the electric motor 50; the warning signal can be used to control the display screen 60 or the speaker 70.

It can be seen from the above description that the present invention adopts a multi-stage progressive control method to gradually improve the intensity of the automatic brake, thereby realizing the function of instant reminding and active braking assistance, and can effectively realize the safety protection of the electric two-wheeled vehicle, thereby realizing the special technical effects of active collision protection that is not noticed by the driver due to lack of concentration.

Although the technical content of the present invention has been disclosed by the preferred embodiments as above, it is not intended to limit the present invention. Anyone skilled in the art should make modifications and variations without departing from the spirit of the present invention. In the context of this work, the scope of protection for this work shall be subject to the scope of the patent application as if appended hereto.

What is claimed is:

1. An automatic brake assist device for an electric two-wheeled vehicle, comprising:
    a radar sensor module, used to measure a distance from an opposite object;
    a speed measuring module, used to measure speed of the electric two-wheeled vehicle; and
    a main control module, connected to the radar sensor module and the speed measuring module, when the distance is changed from greater than a first braking distance to less than the first braking distance, performing a first brake braking mode to decelerate the electric two-wheeled vehicle; when the distance is changed from greater than a second braking distance to less than the second braking distance, performing a second brake braking mode to decelerate the electric two-wheeled vehicle; when the distance is changed from greater than a third braking distance to less than the third braking distance, performing a third brake braking mode to decelerate the electric two-wheeled vehicle,
    wherein a braking output to decelerate the electric two-wheeled vehicle under each of the first brake braking mode, the second brake braking mode and the third brake braking mode varies depending on the speed of the electric two-wheeled vehicle measure by the speed measuring module.

2. The automatic brake assist device for an electric two-wheeled vehicle of claim 1, wherein the first braking distance is from 10 meters to 5 meters, the second braking distance is from 5 meters to 3 meters, and the third braking distance is from 3 meters to 1 meter.

3. The automatic brake assist device for an electric two-wheeled vehicle of claim 1, wherein the electric two-wheeled vehicle further comprises a braking system, the braking output is a braking force output by the braking system, the main control module is connected to the braking system, to control the braking system to perform the braking force output of 5-15% in the first brake braking mode, the braking force output of 15-50% in the second brake braking mode, the braking force output of 50-90% in the third brake braking mode.

4. The automatic brake assist device for an electric two-wheeled vehicle of claim 1, wherein the electric two-wheeled vehicle further comprises a braking system, the braking output is a braking force output by the braking system, the main control module is connected to the braking system to control the braking system, in the first brake braking mode, to perform the braking force output of 10-15% when the speed is 25 km/h or more detected by the speed measuring module, the braking force output of 5-10% when the speed is 25-15 km/h detected by the speed measuring module, the braking force output of 1-5% when the speed is 15-10 km/h detected by the speed measuring module; in the second brake braking mode, to perform the braking force output of 35-50% when the speed is 25 km/h or more detected by the speed measuring module, the braking force output of 25-35% when the speed is 25-15 km/h detected by the speed measuring module, the braking force output of 15-25% when the speed is 15-10 km/h detected by the speed measuring module; in the third brake braking mode, to perform the braking force output of 75-90% when the speed is 25 km/h or more detected by the speed measuring module, the braking force output of 60-75% when the speed is 25-15 km/h detected by the speed measuring module, the braking force output of 50-60% when the speed is 15-10 km/h detected by the speed measuring module.

5. The automatic brake assist device for an electric two-wheeled vehicle of claim 1, wherein the electric two-wheeled vehicle further comprises an electric motor, the braking output is a braking power output by the electric motor, the main control module is connected to the electric motor, to control the electric motor to perform the braking power output of 5-15% in the first brake braking mode, the braking power output of 15-50% in the second brake braking mode, the braking power output of 50-90% in the third brake braking mode.

6. The automatic brake assist device for an electric two-wheeled vehicle of claim 1, wherein the electric two-wheeled vehicle further comprises an electric motor, the braking output is a braking power output by the electric motor, the main control module is connected to the electric motor to control the electric motor, in the first brake braking mode, to perform the braking power output of 20-30% when the speed is 25 km/h or more detected by the speed measuring module, the braking power output of 10-20% when the speed is 25-15 km/h detected by the speed measuring module, the braking power output of 5-10% when the speed is 15-10 km/h detected by the speed measuring module; in the second brake braking mode, to perform the braking power output of 30-40% when the speed is 25 km/h or more detected by the speed measuring module, the braking power output of 20-30% when the speed is 25-15 km/h detected by the speed measuring module, the braking power output of 10-20% when the speed is 15-10 km/h detected by the speed measuring module; in the third brake braking mode, to perform the braking power output of 50-70% when the speed is 25 km/h or more detected by the speed measuring module, the braking power output of 30-50% when the speed is 25-15 km/h detected by the speed measuring module, the braking power output of 20-30% when the speed is 15-10 km/h detected by the speed measuring module.

7. An automatic brake assist device for an electric two-wheeled vehicle, the electric two-wheeled vehicle comprising a main control module, comprising:
a radar sensor module, used to measure a distance from a pair of objects;
a speed measuring module, used to measure speed of the electric two-wheeled vehicle; and
a control module, connected to the radar sensor module and the main control module, when the distance is changed from greater than a first braking distance to less than the first braking distance, transmitting a first brake braking mode signal to the main control module to decelerate the electric two-wheeled vehicle; when the distance is changed from greater than a second braking distance to less than the second braking distance, transmitting a second brake braking mode signal to the main control module to decelerate the electric two-wheeled vehicle; when the distance is changed from greater than a third braking distance to less than the third braking distance transmitting a third brake braking mode signal to the main control module to decelerate the electric two-wheeled vehicle,
wherein a braking output to decelerate the electric two-wheeled vehicle under each of the first brake braking mode, the second brake braking mode and the third brake braking mode varies depending on the speed of the electric two-wheeled vehicle measured by the speed measuring module.

8. The automatic brake assist device for an electric two-wheeled vehicle of claim 7, wherein the first braking distance is from 10 meters to 5 meters, the second braking distance is from 5 meters to 3 meters, and the third braking distance is from 3 meters to 1 meter.

9. The automatic brake assist device for an electric two-wheeled vehicle of claim 7, wherein the electric two-wheeled vehicle further comprises a braking system, the braking output is a braking force output by the braking system, the main control module is connected to the braking system, to control the braking system to perform the braking force output of 5-15% in the first brake braking mode, the braking force output of 15-50% in the second brake braking mode, the braking force output of 50-90% in the third braking brake mode.

10. The automatic brake assist device for an electric two-wheeled vehicle of claim 7, wherein the electric two-wheeled vehicle further comprises a braking system, the braking output is a braking force output by the braking system, the main control module is connected to the braking system, the control module controls the braking system to perform the braking force output of 5-15% in the first brake braking mode, the braking force output of 15-50% in the second brake braking mode, the braking force output of 50-90% in the third brake braking mode.

11. The automatic brake assist device for an electric two-wheeled vehicle of claim 7, wherein the electric two-wheeled vehicle further comprises an electric motor, the braking output is a braking power output by the electric motor, the main control module is connected to the electric motor, to control the electric motor to perform the braking power output of 5-15% in the first brake braking mode, the braking power output of 15-50% in the second brake braking mode, the braking power output of 50-90% in the third brake braking mode.

12. The automatic brake assist device for an electric two-wheeled vehicle of claim 7, wherein the electric two-wheeled vehicle further comprises an electric motor, the braking output is a braking power output by the electric motor, the main control module is connected to the electric motor to control the electric motor, in the first brake braking mode, to perform the braking power output of 20-30% when the speed is 25 km/h or more detected by the speed measuring module, the braking power output of 10-20% when the speed is 25-15 km/h detected by the speed measuring module, the braking power output of 5-10% when the speed is 15-10 km/h detected by the speed measuring module; in the second brake braking mode, to perform the braking power output of 30-40% when the speed is 25 km/h or more detected by the speed measuring module, the braking power output of 20-30% when the speed is 25-15 kmlh detected by the speed measuring module, the braking power output of 10-20% when the speed is 15-10 km/h detected by the speed measuring module; in the third brake braking mode, to perform the braking power output of 50-70% when the speed is 25 km/h or more detected by the speed measuring module, the braking power output of 30-50% when the speed is 25-15 kinth detected by the speed measuring module, the braking power output of 20-30% when the speed is 15-10 km/h detected by the speed measuring module.

\* \* \* \* \*